(12) United States Patent
Nakajima

(10) Patent No.: US 8,118,522 B2
(45) Date of Patent: Feb. 21, 2012

(54) WORKING APPARATUS

(75) Inventor: Masaharu Nakajima, Shizuoka (JP)

(73) Assignee: Senjo Seiki Co., Ltd., Shizuoka (JP)

( * ) Notice: Subject to any disclaimer, the term of this patent is extended or adjusted under 35 U.S.C. 154(b) by 838 days.

(21) Appl. No.: 12/205,424

(22) Filed: Sep. 5, 2008

(65) Prior Publication Data

US 2010/0062689 A1   Mar. 11, 2010

(51) Int. Cl.
  *B23F 11/00*  (2006.01)
  *B23F 19/10*  (2006.01)
  *B23F 23/08*  (2006.01)
  *B23C 3/12*  (2006.01)
  *B23C 1/14*  (2006.01)
  *B23Q 16/00*  (2006.01)

(52) U.S. Cl. ............... 409/8; 409/48; 409/61; 409/168; 409/201; 409/138; 409/140; 269/59; 269/63

(58) Field of Classification Search ............. 409/3, 8–9, 409/48, 61, 125, 126, 138–140, 165, 168, 409/201, 211, 216, 224, 218, 235, 236, 237, 409/241; 269/57, 58, 59, 62, 63, 71, 74, 269/80
See application file for complete search history.

(56) References Cited

U.S. PATENT DOCUMENTS

| 4,203,183 | A | * | 5/1980 | Pavlovsky | 409/140 |
| 4,637,775 | A | * | 1/1987 | Kato | 409/138 |
| 4,993,896 | A | * | 2/1991 | Dombrowski et al. | 409/138 |
| 6,027,288 | A | * | 2/2000 | Senjo | 409/138 |
| 2002/0085893 | A1 | * | 7/2002 | Geiger et al. | 409/168 |

FOREIGN PATENT DOCUMENTS

| JP | 5-200655 A |   | 8/1993 |
| JP | 11-197930 A |   | 7/1999 |
| JP | 2007-069317 A | * | 3/2007 |

OTHER PUBLICATIONS

Machine Translation of JP 2007-069317, which JP '317 was published Mar. 2007.*

* cited by examiner

*Primary Examiner* — Erica E Cadugan
(74) *Attorney, Agent, or Firm* — Sughrue Mion, PLLC

(57) ABSTRACT

A working apparatus, provided with a base stage, work hold and rotation device for holding and rotating a work, working device movable toward and away from the work via slider mechanism and having a working tool, press structure for pressing the working tool toward the work via the working device, and trace device pressed toward the work together with the working tool by the press structure and in contact with the work and moving the working device as a whole in forward and rearward directions according to outer shape of the work. By pressing of the pressing structure, the working tool deburrs and chamfers under control of working volume by the trace device. The work hold and rotation device has work rotation axis angle adjustment mechanism, for adjusting angle of rotation axis of the work by holding the work. The working apparatus can precisely deburr and chamfer complicated shape of work such as worm gear.

7 Claims, 15 Drawing Sheets

WORKING APPARATUS

BACKGROUND OF THE INVENTION

1. Field of the Invention

The present invention relates to a working apparatus. The working apparatus of the present invention is provided with trace means, which traces the outer surface of industrial component having complicated shape such as worm gear, which has been manufactured by any working machine through cutting work, die casting, injection molding, punching press, lost-wax casting, die forging, etc., (hereinafter, such industrial components will be collectively referred to as "work"), so that the trace means may trace the optimum shape of work, for the purpose of deburring or chamfering of such work. The working apparatus of the present invention is also provided with working means for working on the surface of the work, and with work hold and rotation means which rotates the work by keeping the position of the work.

2. Description of the Related Art

When the work has been manufactured by any working machine, through cutting work, die casting, injection molding, punching press, lost-wax casting, or die forging, there would occur unnecessary "burr" on the outer edge of the work. After manufacturing of the work, the burr should be removed (deburred) by flexible tool such as brushing wheel, wire wheel, etc., in order to finish as the final product.

Also, when the chamfering should be applied to the work surface according to the outer shape of the work, or when the end surface of the work should be finished at a predetermined precision standard, then any cutting tool such as end mill, rotary bur or chamfer cutter would be used for chamfering or finishing of the work.

However, such kind of working machine would move the cutting tool based on predetermined trajectory information obtained by a model work, thus the same and stereotypical cutting work would be applied to every work.

In addition, when the above trajectory information is set, a great number of programming points should be set along the outer shape of the model work, and the corresponding great number of coordinate axes should be obtained. This would require heavy workload and long processing time.

In the light of the above circumstances, the applicant invented and filed patent applications regarding "tracing working apparatus" as disclosed in Patent Document 1, as well as "working apparatus" as disclosed in Patent Document 2, as shown below. These inventions would present low-price working machines, capable of carrying out a desired working without requiring any complicated control, and without requiring data input and save of complicated trajectory information.

[Patent Document 1] Unexamined Japanese Patent Publication No. Hei 5-200655.

[Patent Document 2] Unexamined Japanese Patent Publication No. Hei 11-197930.

However, the working apparatus as disclosed above would have several problems. For example, FIG. 15 is a side view of a worm gear, shown as an example of a work W. There is a tooth 201 formed in the helicoid shape, and burr would occur on a top end A and a bottom end B. When the above working machine is used for removing the burr, a peak 203 of the tooth 201 adjacent thereto would become an obstacle for deburring, and trace means cannot be in contact with the work W.

According to the working machine as discussed above, the work W is held by a work chuck in an upright state, and the rotation axis of the work W is always in the vertical direction. Thus, when the trace means positioned above the work W approaches to be in contact with the work W, the top end A at the upper position of the work W, or the peak 203 of the tooth 201 at the bottom end B, would become obstacles, and the trace means cannot be in contact with a valley 205 of the tooth 201 positioned below the peak 203. Consequently, it is very difficult to carry out chamfering and finishing of the work W, such as the worm gear, by using conventional working machine as discussed above.

SUMMARY OF THE INVENTION

In the light of problems as discussed above, it is an object of the present invention to provide a working apparatus, which can carry out deburring, chamfering and finishing of work W in complicated shape such as worm gear, of which shape would change not only in cross sectional direction, but also in axial direction, with simple structure, and with precision and effective performance.

To achieve the object as mentioned above, according to the present invention, there is a working apparatus, comprising: a base stage; work hold and rotation means mounted on the base stage, serving for holding and rotating a work; working means, mounted on the base stage, movable toward and away from the work, and provided with a working tool; press means for pressing the working tool toward the work via the working means; and trace means, mounted on the working means, pressed toward the work together with the working tool by the press means, and in contact with the work and whereby moving the working means as a whole in forward and rearward directions according to outer shape of the work. This working apparatus is also provided with a structure that the press means presses the working tool and the trace means toward the work in rotation, whereby the working tool applies deburring and chamfering to the work, as well as the trace means becomes in contact with the work and controls deburring and chamfering of the working tool at a predetermined constant volume, so that deburring and chamfering on whole circumferential surface of the work may be carried out at the predetermined constant volume. This working apparatus is characterized in that the work hold and rotation means is provided with work rotation axis angle adjustment mechanism, serving for adjusting angle of rotation axis of the work in a state of holding the work.

According to the present invention, there is the working apparatus, wherein the work rotation axis angle adjustment mechanism is provided with: a swing frame for supporting the work hold and rotation means; a swing shaft integrally attached to the swing frame; a slide unit provided with a thread shaft in which a male thread being engraved and also provided with a female thread block for engaging with the thread shaft; and link mechanism for converting motion of the slide unit in traverse direction into rotative direction of the swing shaft, wherein the swing frame swings by traverse movement of the slide unit via the link mechanism and the swing shaft, whereby angle of rotation axis of the work by the work hold and rotation means may be adjusted.

According to of the present invention, there is the working apparatus, wherein: the link mechanism comprising, a swing arm swinging integrally with the swing shaft, and a link arm for connecting the swing arm and the slide unit; the swing arm having an arc-shaped slotted hole of which circumferential center is positioned at swing fulcrum of the swing arm; and lock means is provided, capable of fixing angle of rotation axis of the work by fastening a lock bolt inserted in the slotted hole.

According to the present invention, there is the working apparatus, further comprising working tool rotation axis angle adjustment mechanism, capable of adjusting angle of rotation axis of the working tool.

According to the present invention, there is the working apparatus, wherein the working tool rotation axis angle adjustment mechanism further comprising rotation forcing means, on which the working means may be mounted in rotative state, and which adjusts angle of rotation axis of the working tool by rotating the working tool.

According to the present invention, there is the working apparatus, further comprising lock means for locking and holding angle adjusted by the working tool rotation axis angle adjustment mechanism.

And according to the present invention, there is the working tool, wherein the work is a worm gear.

As discussed above, the working apparatus according to the present invention comprises: the base stage; the work hold and rotation means mounted on the base stage, serving for holding and rotating the work; the working means, mounted on the base stage, movable toward and away from the work, and provided with the working tool; the press means for pressing the working tool toward the work via the working means; and the trace means, mounted on the working means, pressed toward the work together with the working tool by the press means, and in contact with the work and whereby moving the working means as a whole in forward and rearward directions according to outer shape of the work. This working apparatus is also provided with the structure that the press means presses the working tool and the trace means toward the work in rotation, whereby the working tool applies deburring and chamfering to the work, as well as the trace means becomes in contact with the work and controls deburring and chamfering of the working tool at a predetermined constant volume, so that deburring and chamfering on the whole circumferential surface of the work may be carried out at the predetermined constant volume. This working apparatus is also characterized in that the work hold and rotation means is provided with the work rotation axis angle adjustment mechanism, serving for adjusting angle of the rotation axis of the work in a state of holding the work. Therefore, the work can be held and rotated in slant state, and the trace means, positioned at the upper part, may trace the work such as worm gear having complicated shape.

Preferably, according to the working apparatus, the work rotation axis angle adjustment mechanism is provided with: the swing frame for supporting the work hold and rotation means; the swing shaft integrally attached to the swing frame; the slide unit provided with the thread shaft in which the male thread being engraved and also provided with the female thread block for engaging with the thread shaft; and the link mechanism for converting motion of the slide unit in traverse direction into rotative direction of the swing shaft. The swing frame swings by traverse movement of the slide unit via the link mechanism and the swing shaft, whereby angle of rotation axis of the work by the work hold and rotation means may be adjusted. Thus the angle of rotation axis of the work can be adjusted precisely by simple structure.

Preferably, according to the working apparatus, the link mechanism comprises, the swing arm swinging integrally with the swing shaft, and the link arm for connecting the swing arm and the slide unit. The swing arm has the arc-shaped slotted hole of which circumferential center is positioned at swing fulcrum of the swing arm. Also the lock means is provided, capable of fixing angle of rotation axis of the work by fastening the lock bolt inserted in the slotted hole. Thus the adjusted angle of the work rotation axis can be locked, and the work can be rotated safely and stably.

Preferably, according to the working apparatus, there is further the working tool rotation axis angle adjustment mechanism, capable of adjusting angle of rotation axis of the working tool. Therefore, both the rotation axis angle of the work, and the rotation axis angle of the working tool, can be adjusted, and thus the deburring, chamfering and finishing of the work having more complicated surface shape can be carried out. In addition, it is also possible to relatively expand the angle of action regarding the working means and the trace means against the work.

Preferably, according to the working apparatus, the working tool rotation axis angle adjustment mechanism also comprises the rotation forcing means, on which the working means may be mounted in rotative state, and which adjusts angle of rotation axis of the working tool by rotating the working tool. Thus the angle of rotation axis of the working tool can be adjusted precisely by simple structure.

Preferably, according to the working apparatus, there is the lock means for locking and holding the angle adjusted by the working tool rotation axis angle adjustment mechanism. Thus the adjusted angle of the working tool rotation axis can be locked, and the working tool can be rotated safely and stably.

And preferably, according to the working apparatus, the work is worm gear. Therefore, remarkable effect of the present invention may be expressed during chamfering or deburring of the both ends of the worm gear.

BRIEF DESCRIPTION OF THE DRAWINGS

The invention will be described below in detail with reference to the accompanying drawings, in which.

DETAILED DESCRIPTION OF THE INVENTION

Figure 1:
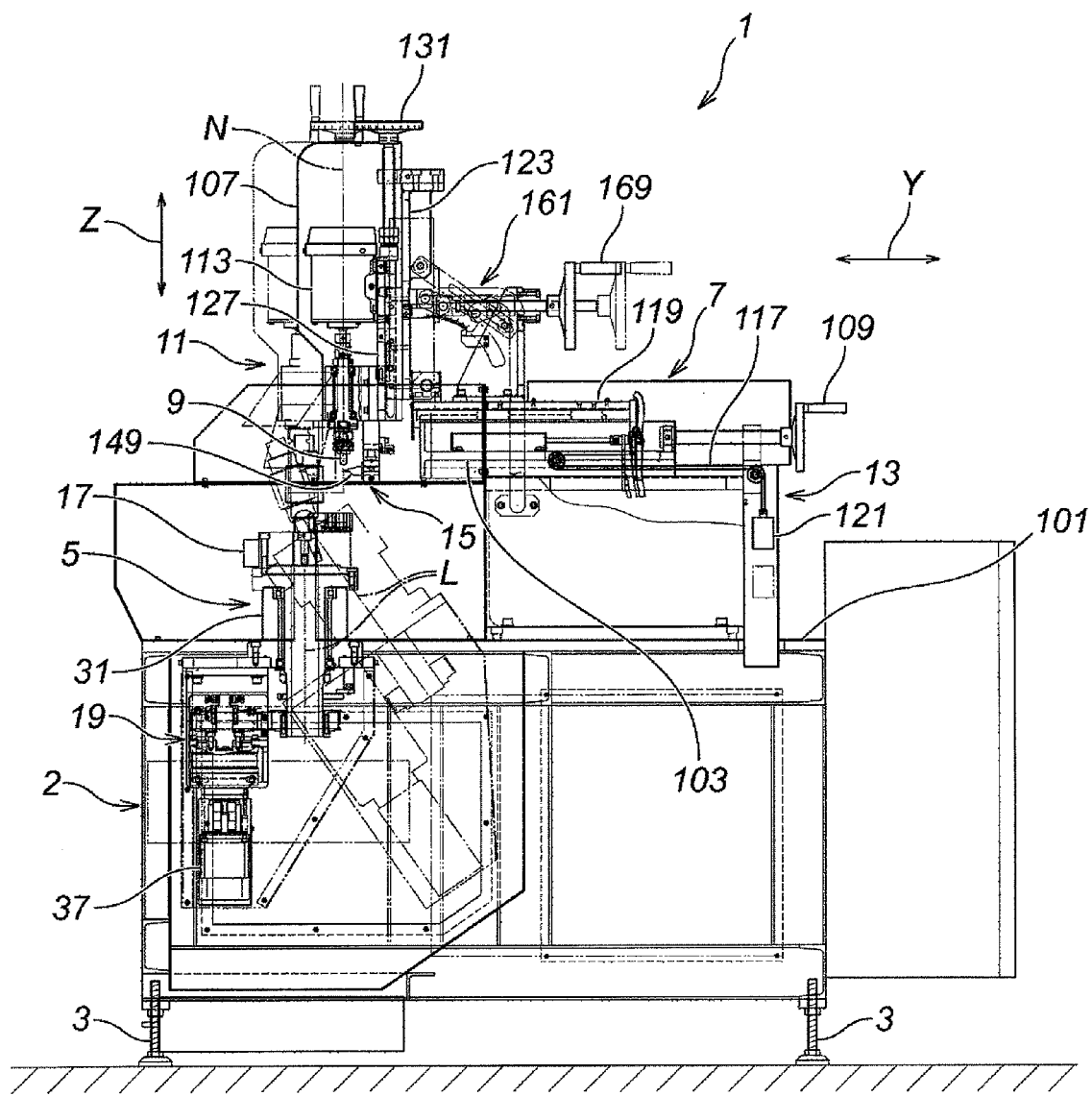
FIG. 1 is a side view of a working apparatus according to an embodiment of the present invention.
Figure 2:
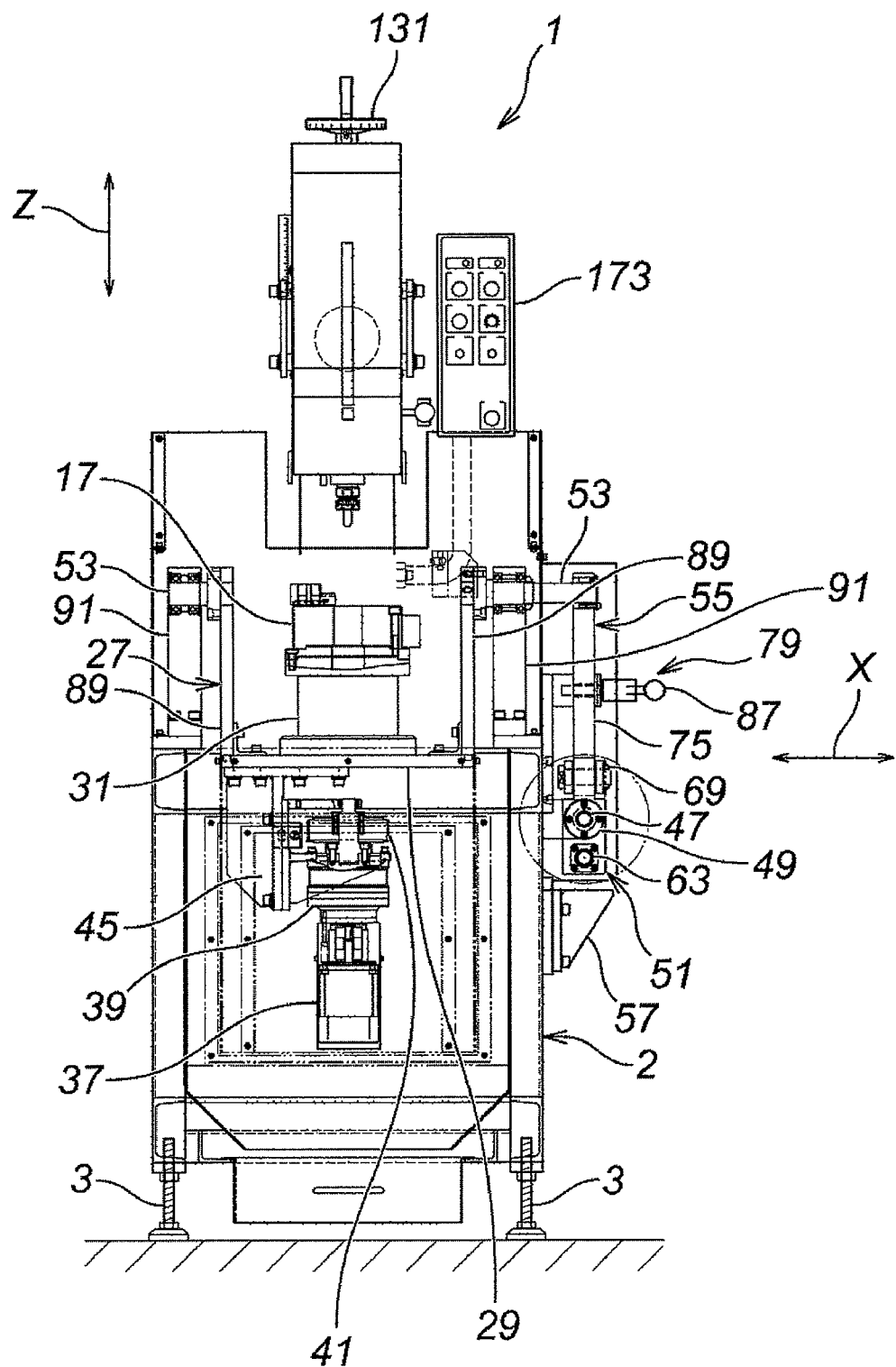
FIG. 2 is a front view of the working apparatus according to the embodiment of the present invention.
Figure 3:
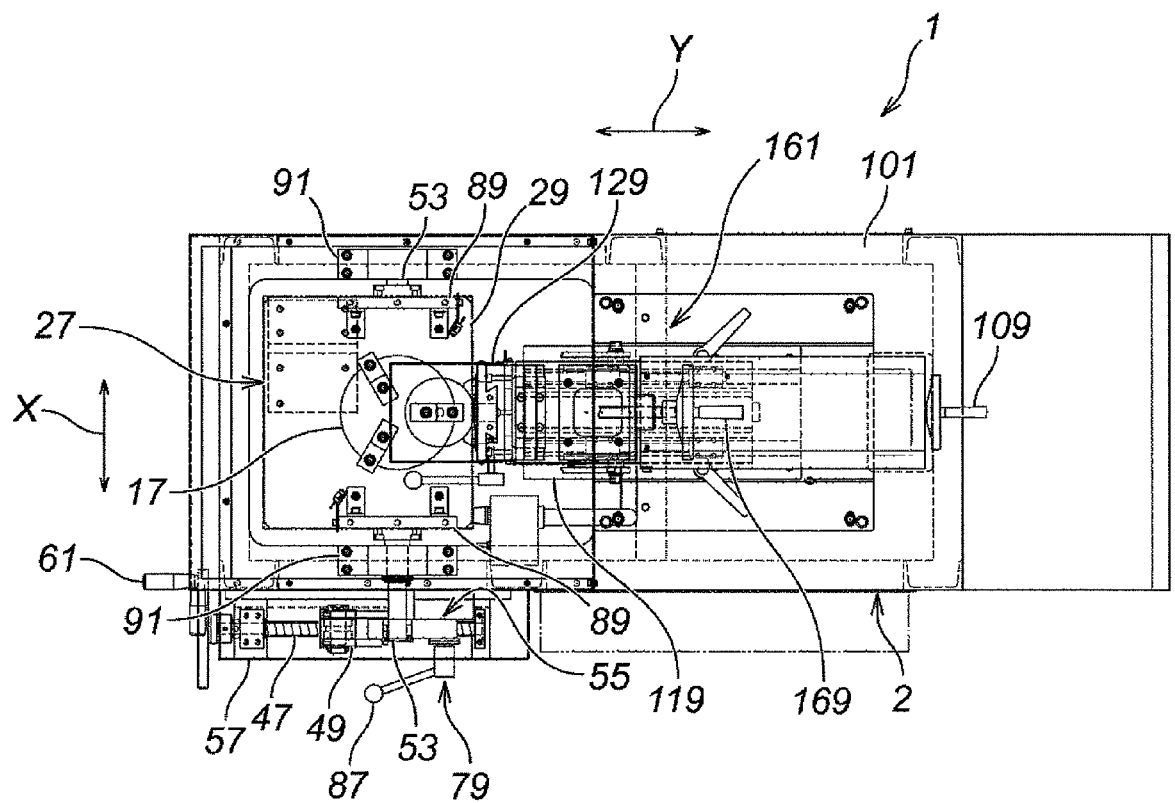
FIG. 3 is a plan view of the working apparatus according to the embodiment of the present invention.

An embodiment of the present invention will now be described with reference to FIGS. 1 through 15. FIG. 1 is a side view of a working apparatus according to the present invention, serving for various workings such as deburring, chamfering and finishing on the surface of work. FIG. 2 is a front view, and FIG. 3 is a plan view, respectively, of the working apparatus according to the present embodiment.

There is a working apparatus 1 having a base stage 2. The base stage 2 is made of frame members such as channel steel, assembled to form as rectangular frames. As shown in FIGS. 1 and 2, each corner on the bottom surface of the base stage has a height-adjustable leg 3, thus there are in total four legs 3 (among which, FIGS. 1 and 2 show only two legs 3). There are work hold and rotation means 5, slider mechanism 7, working means 11 and press means 13 mounted on the base stage 2. The work hold and rotation means 5 holds and rotates a work W. The working means 11 is provided on the slider mechanism 7 in slidable state (movable in traverse directions) against the slider mechanism 7, and having a working tool 9, being movable toward and away from the work W. The press means 13 presses the working tool 9 toward the work W via the working means 11. There is also trace means 15 mounted on the working means 11, to which the press force is applied together with the working tool 9 by the press means 13 toward the work W, so that the working means 11 may move as a whole in forward and rearward directions according to outer shape of the work W.

Figure 4:
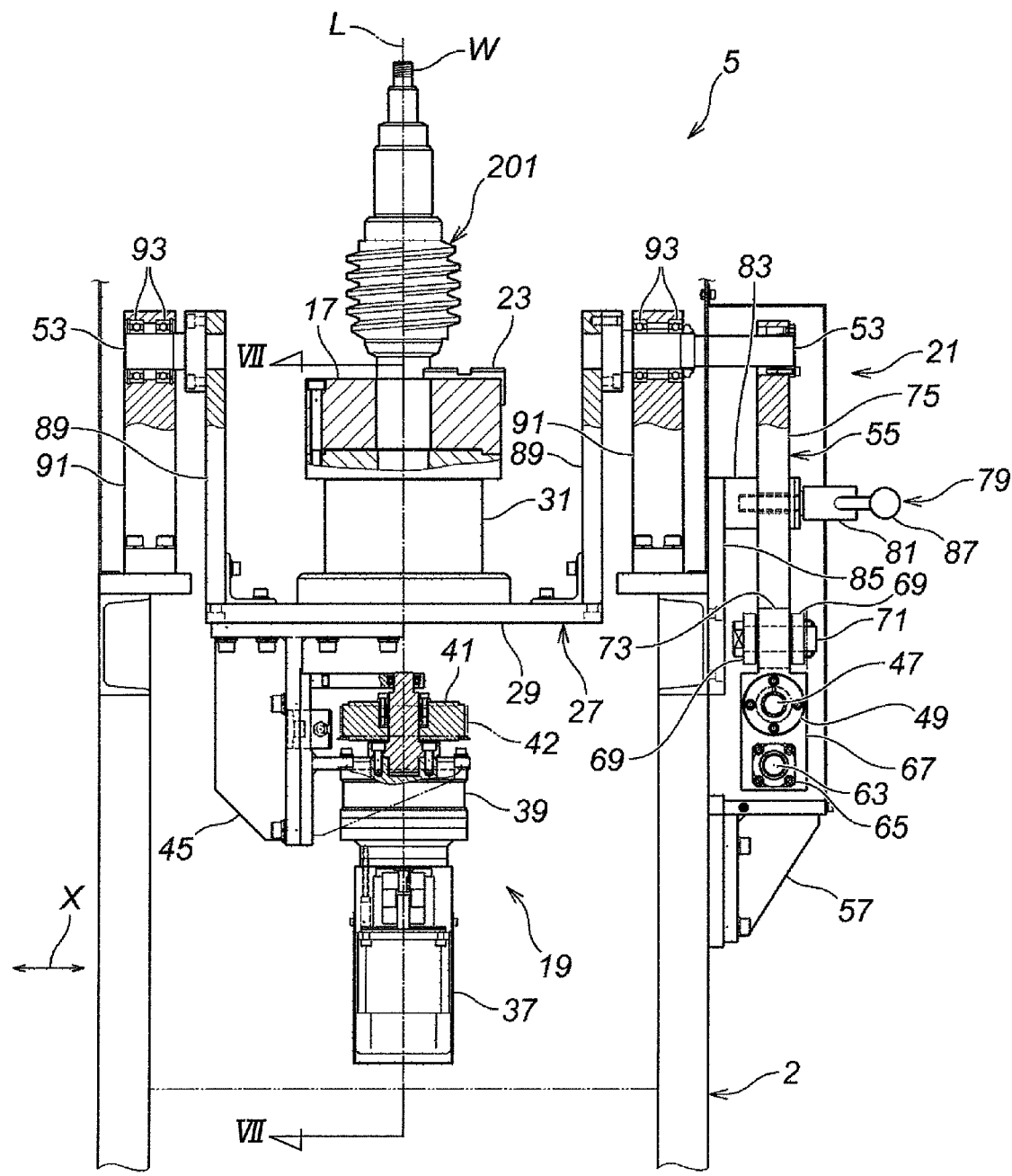
FIG. 4 is a front view of work hold and rotation means according to the embodiment of the present invention.
Figure 5:
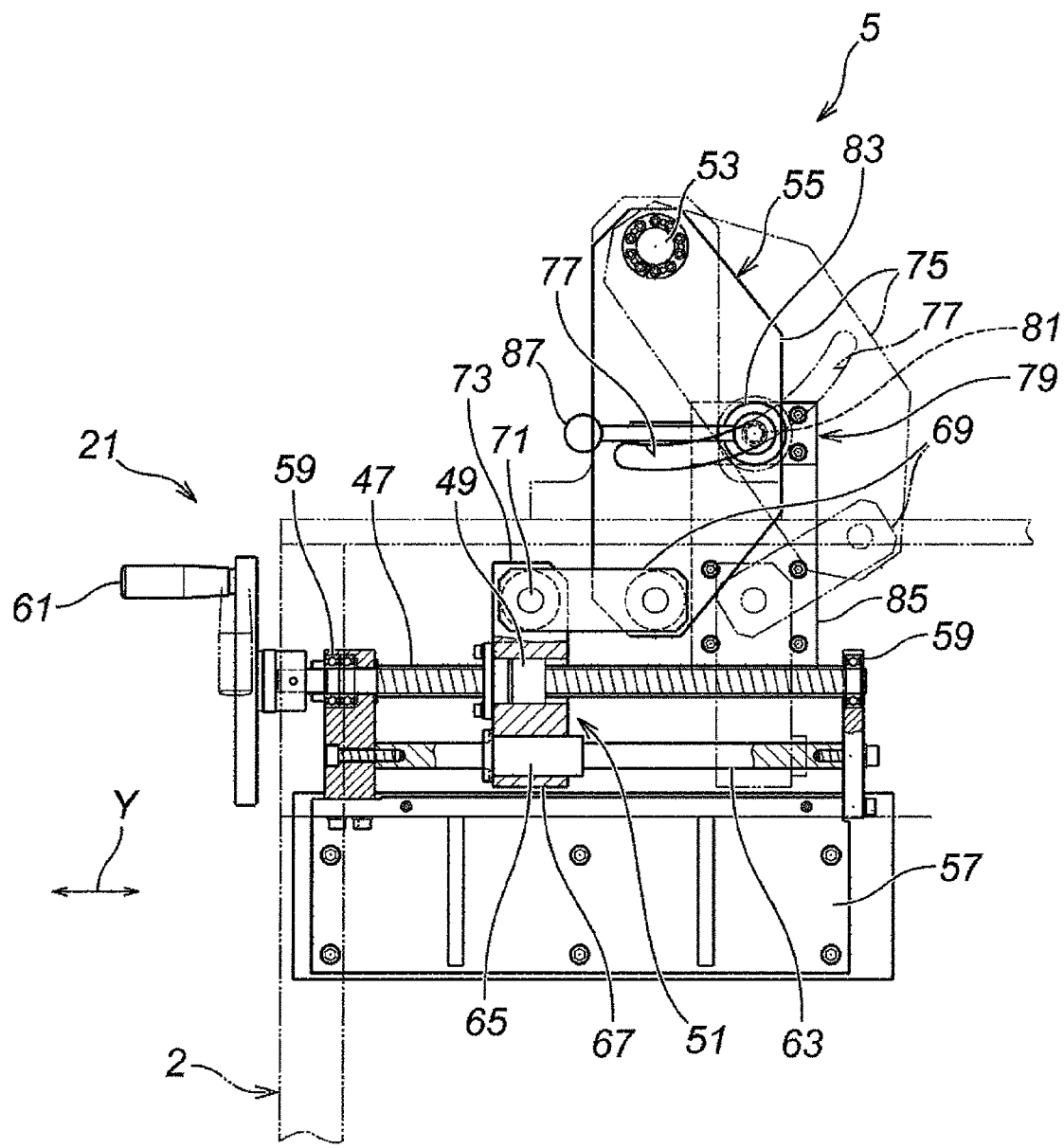
FIG. 5 is a side view of the work hold and rotation means according to the embodiment of the present invention.
Figure 6:
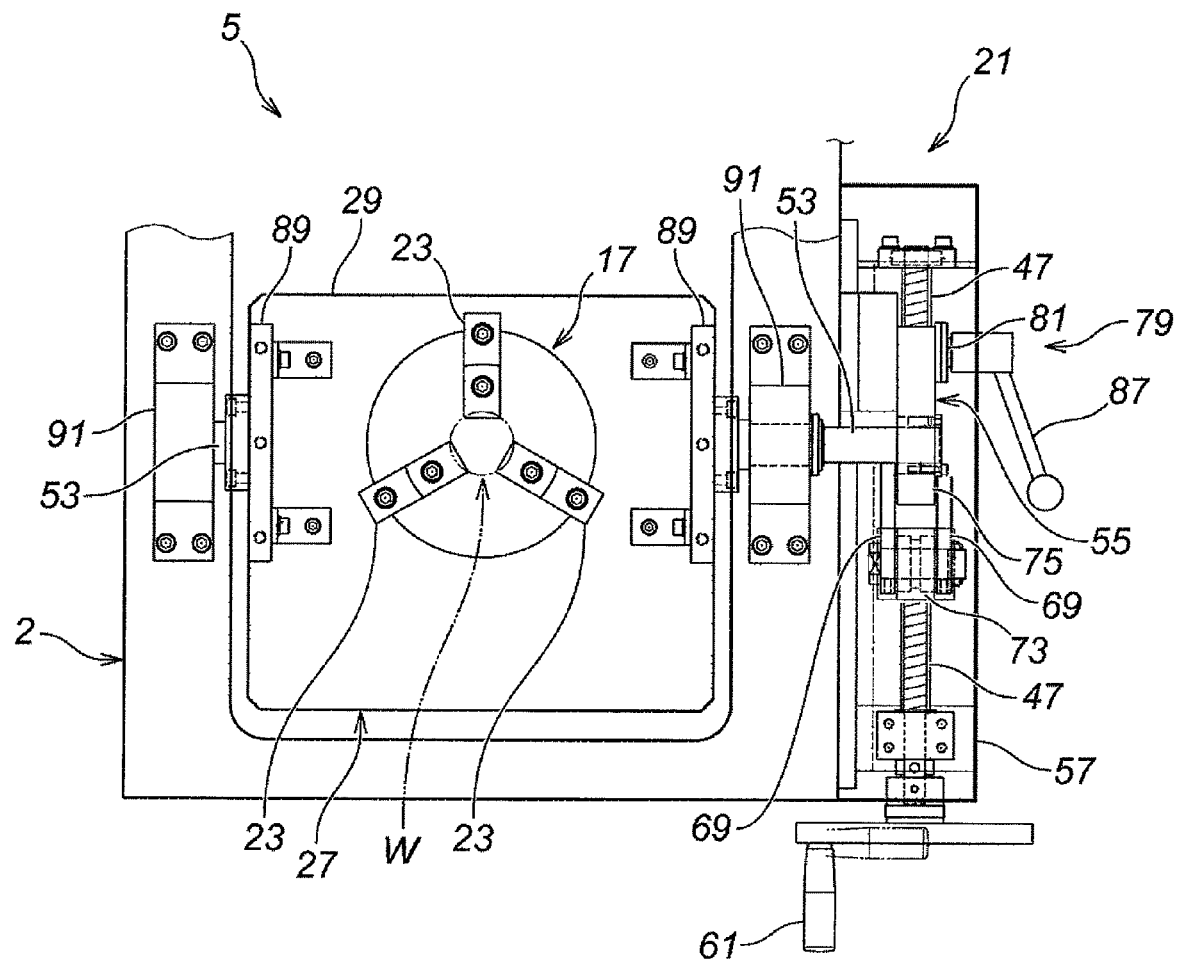
FIG. 6 is a plan view of the work hold and rotation means according to the embodiment of the present invention.
Figure 7:
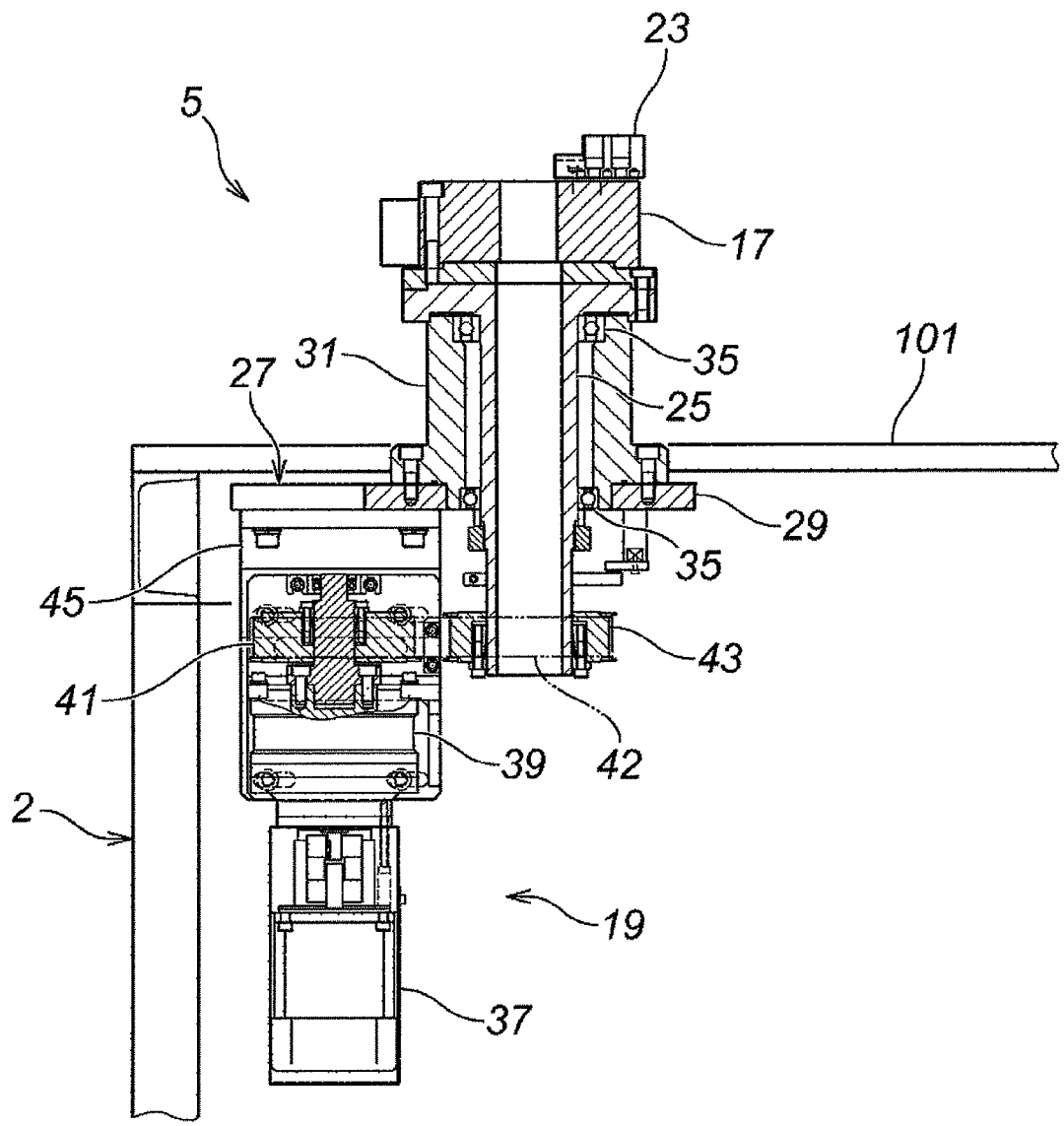
FIG. 7 is a sectional view of line VII-VII of FIG. 4.

FIGS. 4 is a front view of the work hold and rotation means 5, serving for holding and rotating the work W. FIG. 5 is a side view, and FIG. 6 is a plan view, respectively, of the work hold and rotation means 5. FIG. 7 is a sectional view as being cut by the line VII-VII of FIG. 4.

The work hold and rotation means 5 is a characteristic part of the present invention, provided with a work chuck 17, work rotation driving means 19, and work rotation axis angle adjustment mechanism 21. The work chuck 17 holds the work W. The work rotation driving means 19 rotates the work W held by the work chuck 17. The work rotation axis angle adjustment mechanism 21 is capable of adjusting angle of rotation axis L of the work W in a state that the work W is held.

As illustrated in FIG. 6, the work chuck 17 serves as a holding member of the work W, and has three claws 23 movable forwardly and rearwardly in radial direction. There is a cylindrical shape of work rotation shaft 25 below the work chuck 17 as shown in FIG. 7, integrally formed with the work chuck 17. The work rotation shaft 25 has a dish-shaped flange part at the top, and the rotation axis of the work rotation shaft 25 coincides with that of the work chuck 17.

As illustrated in FIG. 7, the work rotation shaft 25 elongates downwardly, penetrating through a penetration hole formed on a bottom panel 29 of a swing frame 27 (which will be discussed below). A work rotation shaft holder 31 provided on the bottom panel 29 pivotally supports the work rotation shaft 25, via bearings 35, 35.

Also as illustrated in FIG. 7, the work rotation driving means 19 is provided with a work rotation shaft driving motor 37 serving as a driving source, a decelerator 39 connected to an output shaft of the work rotation shaft driving motor 37, a driver pulley 41 attached to an output shaft of the decelerator 39, and a driven pulley 43. The driven pulley 43 is connected to the driver pulley 41 via a belt 42, and is attached to the end of the work rotation shaft 25. The work rotation driving means 19 is attached to the bottom surface of the bottom panel 29 of the swing frame 27 by a supporting bracket 45.

As illustrated in FIGS. 4 through 6, the work rotation axis angle adjustment mechanism 21 is provided with a thread shaft 47 on which the male thread has been engraved, a slide unit 51 having a female thread block 49 to be engaged with the thread shaft 47, link mechanism 55 which converts the movement of the slide unit 51 in traverse direction into the movement of a swing shaft 53 in rotative direction, and the swing frame 27 having the swing shaft 53 and integrally swings with the swing shaft 53.

The thread shaft 47 is a rack-style shaft member extending horizontally in forward-rearward directions of the working apparatus 1 of FIG. 4 (in right-left direction of FIG. 5), having the male thread engraved on the surface, and as shown in FIG. 5, being pivotally supported, via bearings 59, 59, by a pivot support base 57 mounted on the side surface of the base stage 2. There is an operation wheel 61 at the operator-side end of the thread shaft 47, namely the front side of FIG. 4 (left end of FIG. 5), and when an operator rotates this operation wheel 61 in clockwise or counterclockwise direction, the thread shaft 47 will rotate in desired direction, whereby the slide unit 51 may traverse in forward and rearward directions of FIG. 4 (right and left directions of FIG. 5).

The slide unit 51 is provided, as illustrated in FIG. 5, with the female thread block 49 as discussed above, a rod holder 65, and a slide block 67 holding the female thread block 49 and the rod holder 65. There is a rack-style guide rod 63 mounted on the pivot support base 57, extending horizontally parallel to the thread shaft 47, in a state of being inserted in and engaged with the rod holder 65. There are link arms 69 and a link part 73 in the upper part of the slide block 67. The link arms 69 serve as the link mechanism 55 (discussed below), and are rotatively connected to the link part 73 via a link shaft 71.

As illustrated in FIG. 5, the link mechanism 55 has a swing arm 75, of which one end being fixed on the swing shaft 53 so that they may swing integrally around the swing shaft 53, and the link arms 69 for connecting the swing arm 75 to the slide unit 51.

As also illustrated in FIG. 5, there is an arc-shaped slotted hole 77, of which circumferential center is positioned at the swing shaft 53, formed in the swing arm 75. There is also lock means 79 positioned between the base stage 2 and the swing arm 75, serving for locking the motion of the swing arm 75 by utilizing the slotted hole 77.

The lock means 79 is provided, as illustrated in FIGS. 4 and 5, with a lock bolt 81 inserted in the slotted hole 77, a female thread block 83 to be engaged with the lock bolt 81, and a mounting bracket 85 for mounting the female thread block 83 on the base stage 2. There is a manual rotation bar 87 on the head of the lock bolt 81. When the operator rotates the rotation bar 87, the lock bolt 81 is engaged with and fastens tightly the female thread block 83, whereby the adjusted angle position may be locked.

As illustrated in FIG. 4, the swing frame 27 has two side panels 89, 89 positioned on the opposite sides of the bottom panel 29. The upper part of each of the side panels 89, 89 is fixed on each of the two-part structural swing shafts 53, 53, respectively, in a form that the swing shaft 53, 53 are both extending outwardly in horizontal direction.

The swing shafts 53, 53, respectively, are pivotally supported, via bearings 93, 93, by two swing shaft support blocks 91, 91, respectively mounted on the opposite sides of the base stage 2.

The work rotation axis angle adjustment mechanism 21 has the above structure, and the work W held by the work chuck 17 may change the angle of rotation axis L, for example, between 0 degree and 35 degree, by this work rotation axis angle adjustment mechanism 21.

Figure 8:
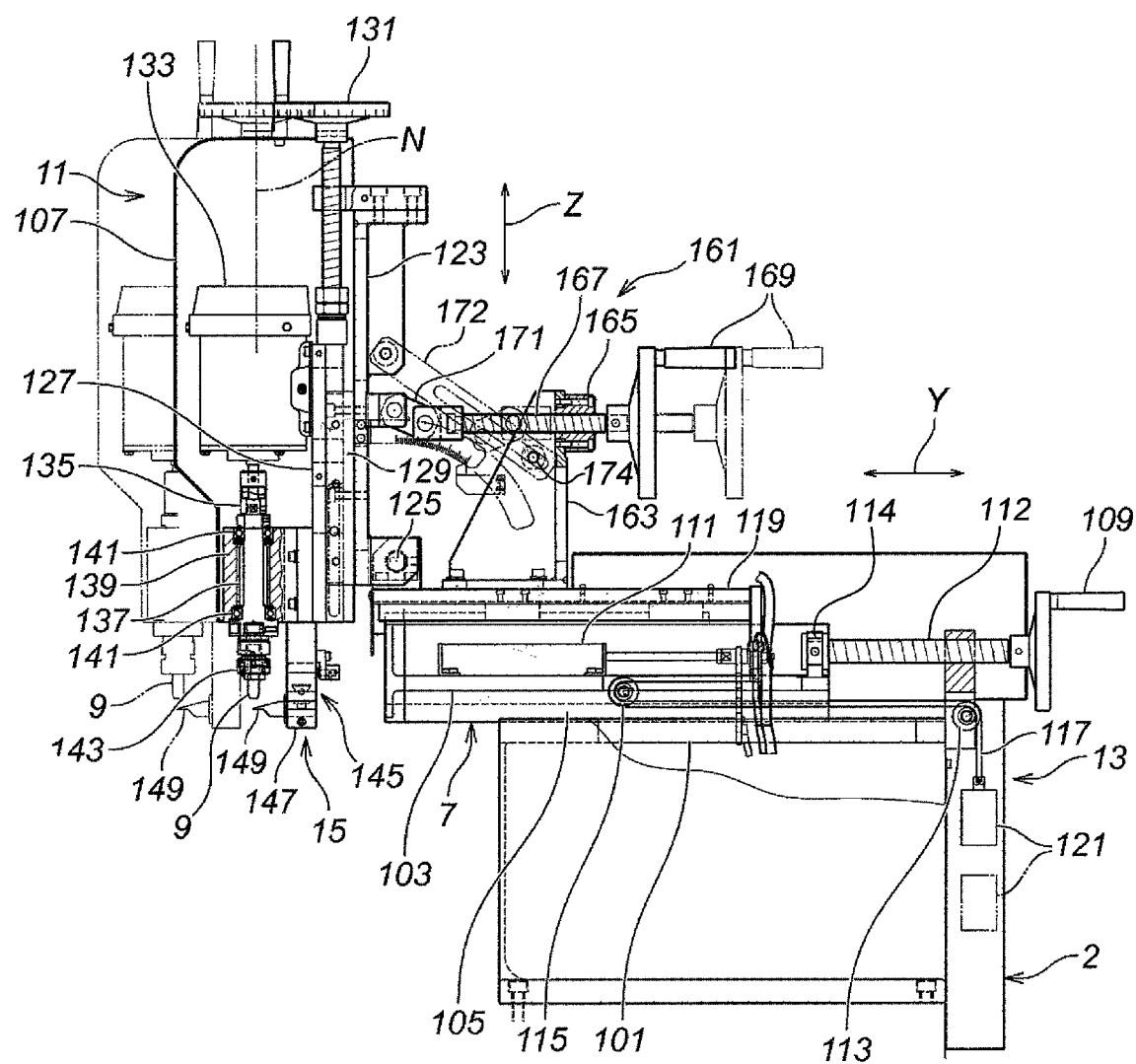
FIG. 8 is a side view of slider mechanism, working means, press means and trace means according to the embodiment of the present invention.
Figure 9:
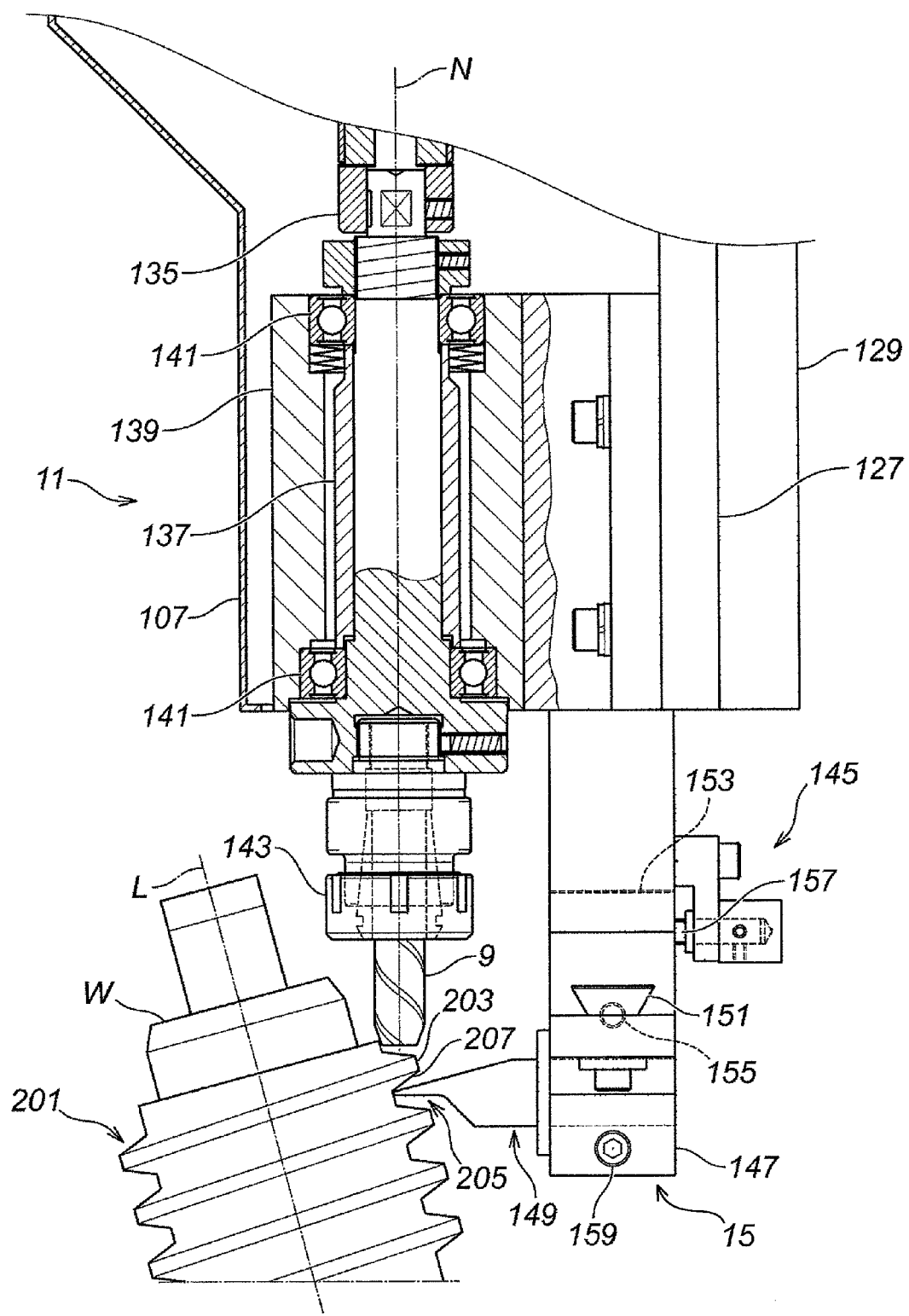
FIG. 9 is an expanded side sectional view around a working tool and the trace means according to the embodiment of the present invention.

Now the structure of the slider mechanism 7, the working means 11, the press means 13 and the trace means 15, will be explained. FIG. 8 is a side view showing the slider mechanism 7, the working means 11, the press means 13 and the trace means 15. FIG. 9 is an expanded side sectional view around the working took 9 and the trace means 15.

There is a base part 101 mounted on the base stage 2, and a Y-direction slide table 103, serving as a part of the slider mechanism 7, is mounted on the base part 101. The Y-direction slide table 103 is movable in Y-direction, i.e. forward-rearward direction of the working apparatus 1 (in the right-left direction of FIG. 1 and FIG. 8), via guide mechanism 105. There is a front-rear position adjustment wheel 109, to which a ball screw 114 is connected. Also, there is a ball nut 114 fixed on the Y-direction slide table 103, whereby the ball screw 112 is engaged with the ball nut 114. Accordingly, when the operator rotates the front-rear position adjustment wheel 109 in desired direction, the Y-direction slide table 103 moves in Y-direction via the ball screw 112 and the ball nut 114.

Further, there is a press table 119 mounted on the Y-direction slide table 103, slidable in forward-rearward directions of the working apparatus 1. There is also guide mechanism comprising guide rail and guide member, positioned between the press table 119 and the Y-direction slide table 103, and the press table 119 slides (traverses) in forward and rearward directions via the guide mechanism.

The press means 13 is provided between the Y-direction slide table 103 and the press table 119. The press means 13 has rotative bodies 113, 115, a chain 117 being connected between and wound around the rotative bodies 113, 115, and a weight 121 connected to one end of the chain 117. Another end of the chain 117 is connected to the press table 119. Thus, the own weight of the weight 121 pulls the chain 117, whereby the pressing force toward the work W is always applied to the press table 119.

There is air cylinder mechanism 111, and when the air cylinder mechanism 111 is actuated properly, the press table 119 may be moved rearwardly against the pressing force of the weight 121 as discussed above.

There is a head base 123 in the upright state in the front end of the press table 119. The head base 123 is mounted to be rotative around a rotation fulcrum 125, and supports the working head 107. There is also a Z-direction slide table 127, serving as another part of the slider mechanism 7, mounted on the front side of the head base 123. The Z-direction slide table 127 is movable in Z-direction (i.e. upward and downward directions) via guide mechanism 129.

The Z-direction slide table 127 has an up-down position adjustment wheel 131 at the top thereof, which adjusts the position of the working head 107, to which the working tool 9 is attached, in upward and downward directions. The front part of the Z-direction slide table 127 has the working means 11 and the trace means 15, which will be explained below. When the operator rotates the up-down position adjustment wheel 131 in desired direction, the Z-direction slide table may move in upward and downward directions.

FIG. 9 shows an expanded view of the working means 11. The working means 11 has a working tool driving motor 133 in the upper part, and as illustrated in FIG. 9, an output shaft of the working tool driving motor 133 is connected to a spindle 137 via a coupling 135.

The spindle 137 is rotatively supported by a spindle holder 139 via bearings 141, 141. The spindle holder 139 is provided in a protrusive manner out of the lower front part of the Z-direction slide table 127. There is a collet chuck 143, provided at the bottom of the spindle 137, so that the working tool 9 may rotate integrally with the spindle 137.

It is possible to use various shape of working tools as the working tool 9 of the present invention. As an example, two-blade square type end mill is used in the embodiment of the present invention.

The trace means 15 is provided with front-rear and right-left positions adjustment mechanism 145 mounted on the lower surface of the spindle holder 139, a trace stylus mount 147 mounted on the lower part of the front-rear and right-left positions adjustment mechanism 145, and a trace stylus 149 which can be attached to and detached from the trace stylus mount 147.

The front-rear and right-left positions adjustment mechanism 145 serves for adjusting the position of the trace stylus 149 both in Y-direction (forward and rearward directions of the working apparatus 1) and in X-direction (right and left directions of the working apparatus 1), and has X-direction dovetail joint mechanism 151 and Y-direction dovetail joint mechanism 153, as well as an X-direction adjustment bolt 155 and a Y-direction adjustment bolt 157 for adjusting the respective dovetail joint positions.

The trace stylus 149 becomes in contact with the work W and traces the shape of the work W. The motion of the trace stylus 149 is conveyed to the working tool 9, whereby constant working volume of the working tool 9 against the work W may be maintained. It is possible to use various shapes and structures of tracing stylus 149, and they can be selected according to the material, size, shape, etc. of the work W.

The above discussed trace stylus 149 is attached to the trace stylus mount 147, and fixed thereon by fastening a fixing bolt 159.

According to the present embodiment, as illustrated in FIG. 8, there is a working tool rotation axis angle adjustment mechanism 161, capable of adjusting the angle of rotation axis N of the working tool 9. The working tool rotation axis angle adjustment mechanism 161 has an L-shaped (when seen on the side view) supporting bracket 163 mounted on the press table 119, a female thread block 165 fixed on the supporting bracket 163, a thread shaft 167 being engaged with the female thread block 165 and extending horizontally in forward-rearward directions (i.e. Y-direction), a working head angle adjustment wheel 169 attached to the rear end part of the thread shaft 167, and link mechanism 171 provided at a position between the front end part of the thread shaft 167 and the head base 123. Accordingly, when the operator rotates the working head angle adjustment wheel 169 in desired direction, the head base 123 will rotate in clockwise direction of FIG. 8, around the rotation fulcrum 125, in a desired rotation volume, whereby the rotation axis of the working tool 9 may slant at a desired angle.

There is a link member 172 attached to a position between the head base 123 and the supporting bracket 163. When a fixing bolt, which has been inserted in a slotted hole of the link member 172, is fastened, the slanted angle of the rotation axis of the working tool 9 may be fixed.

Thus the working tool 9 may change the angle of rotation axis N, for example, between 0 degree and 35 degree, by this working tool rotation axis angle adjustment mechanism 161.

Figure 15:
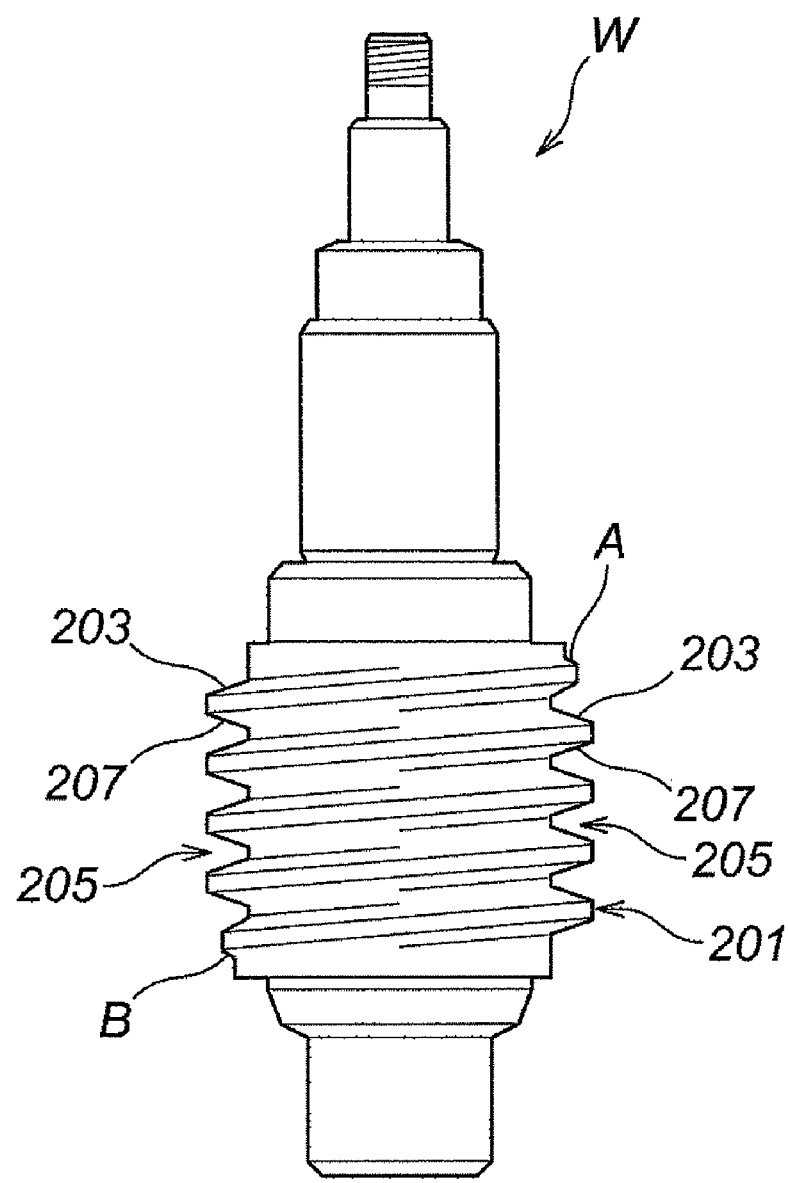
FIG. 15 is a side view of a worm gear as one of examples of work to which working is applied, for giving explanation of prior art, as well as for giving explanation of the embodiment of the present invention.

The motion process of the working apparatus 1 according to the present invention will now be explained, by referring to the chamfering of worm gear (work W) as shown in FIG. 15 as an example. FIGS. 10 through 14 are side views, respectively, of the working tool 9 and the trace stylus 149 carrying out the chamfering of the worm gear (work W), showing the gradual developments of working.

The operator attaches the work W to the work chuck 17, and fixes thereon. Then the operator rotates the operation wheel 61 and moves the work W to a desired angle. Then the angle of the work W is locked by fastening the lock bolt 81.

Figure 10:
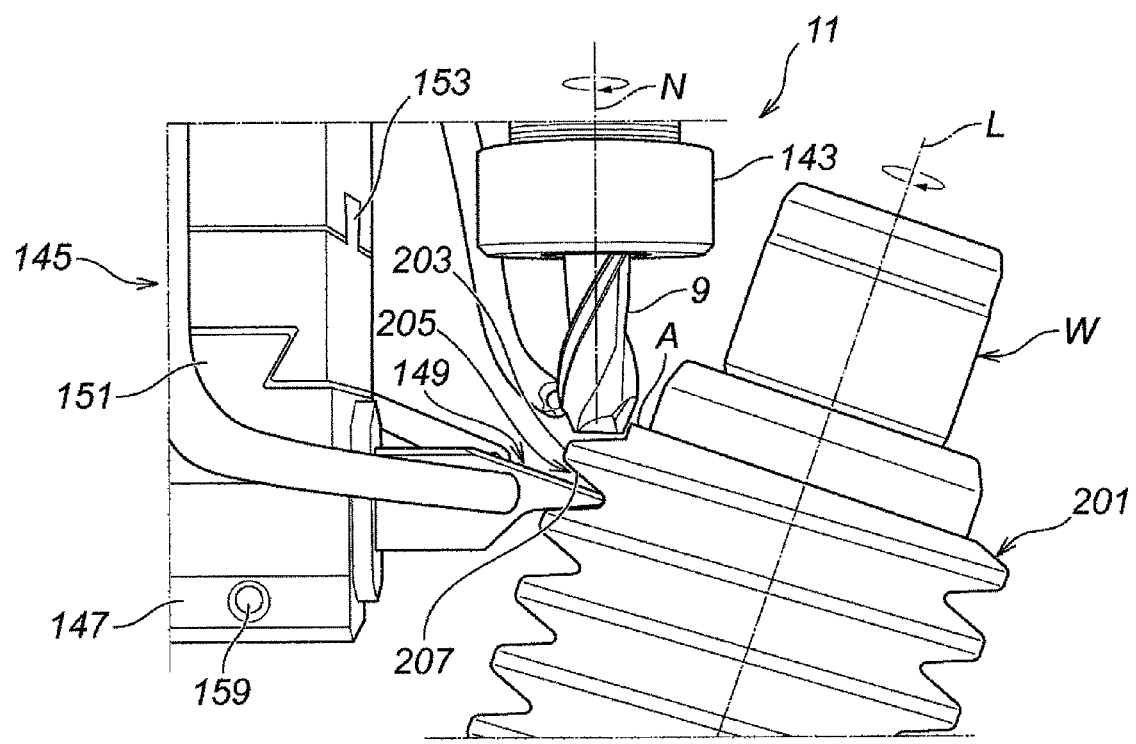
FIG. 10 is a side view of the working tool and a trace stylus according to the embodiment of the present invention, showing the initial (first) status of movement locus during working, as one of gradual developments of working.
Figure 11:
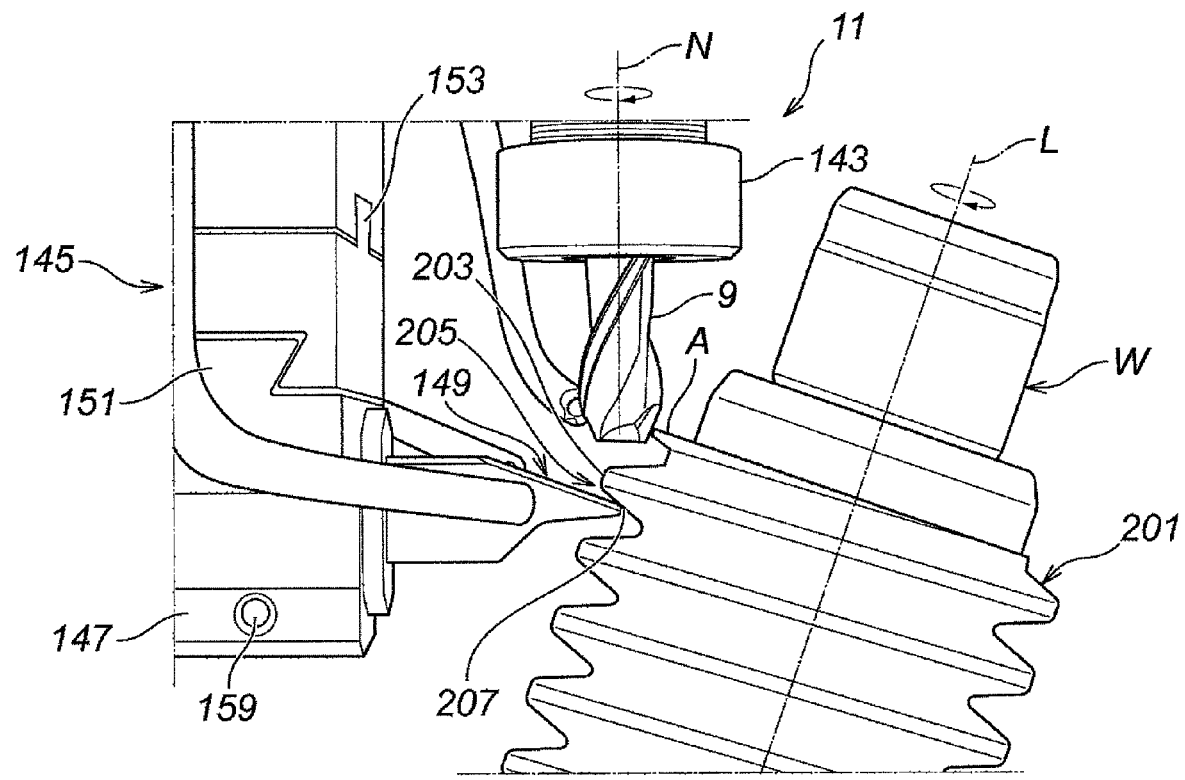
FIG. 11 is a side view of the working tool and the trace stylus according to the embodiment of the present invention, showing the next (second) status of movement locus during working, as one of gradual developments of working.
Figure 12:
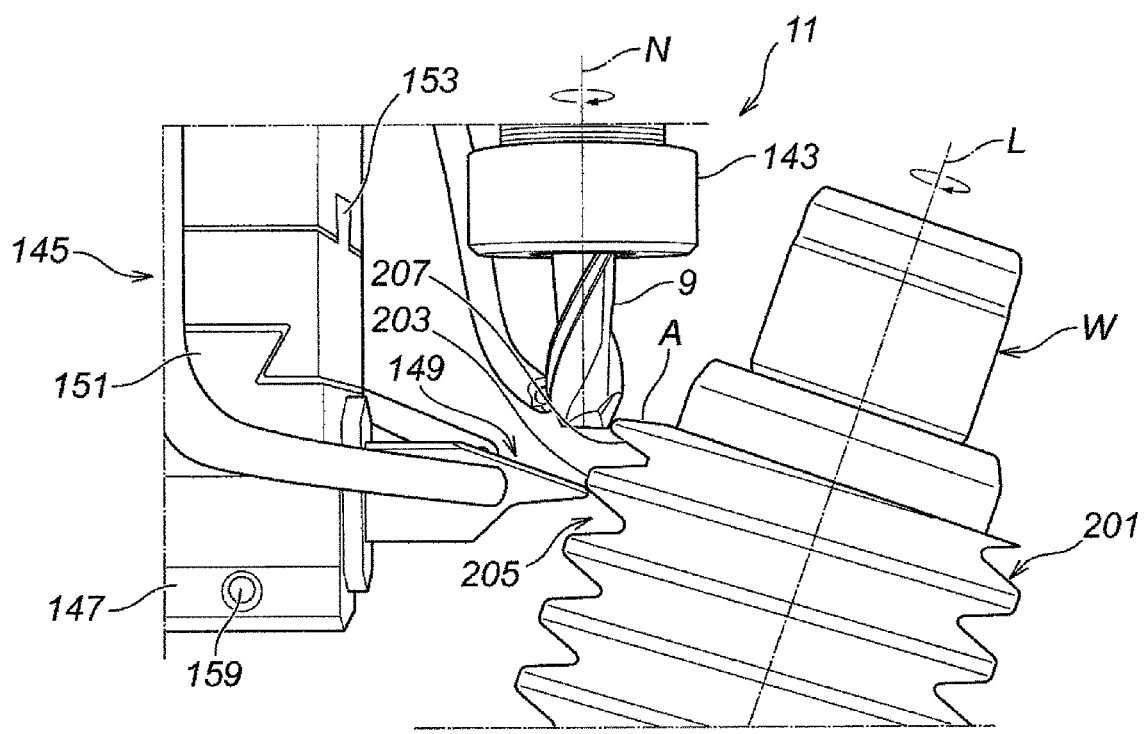
FIG. 12 is a side view of the working tool and the trace stylus according to the embodiment of the present invention, showing the intermediate (third) status of movement locus during working, as one of gradual developments of working.
Figure 13:
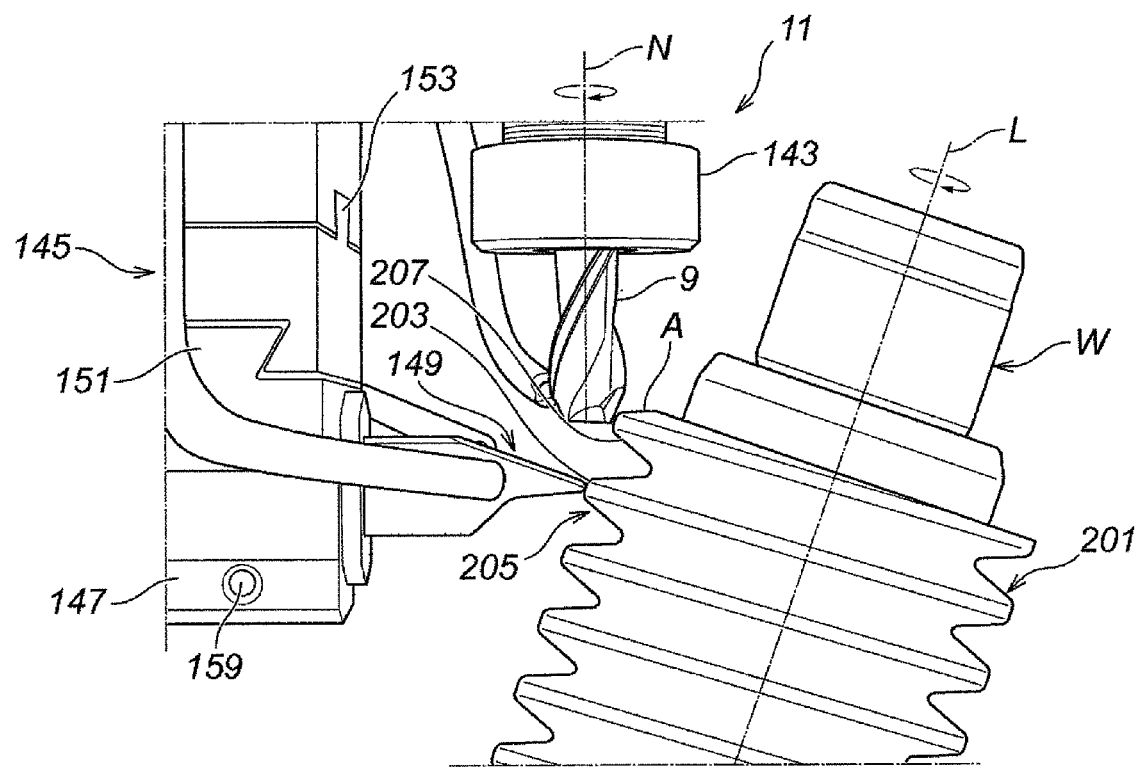
FIG. 13 is a side view of the working tool and the trace stylus according to the embodiment of the present invention, showing the next (fourth) status of movement locus during working, as one of gradual developments of working.
Figure 14:
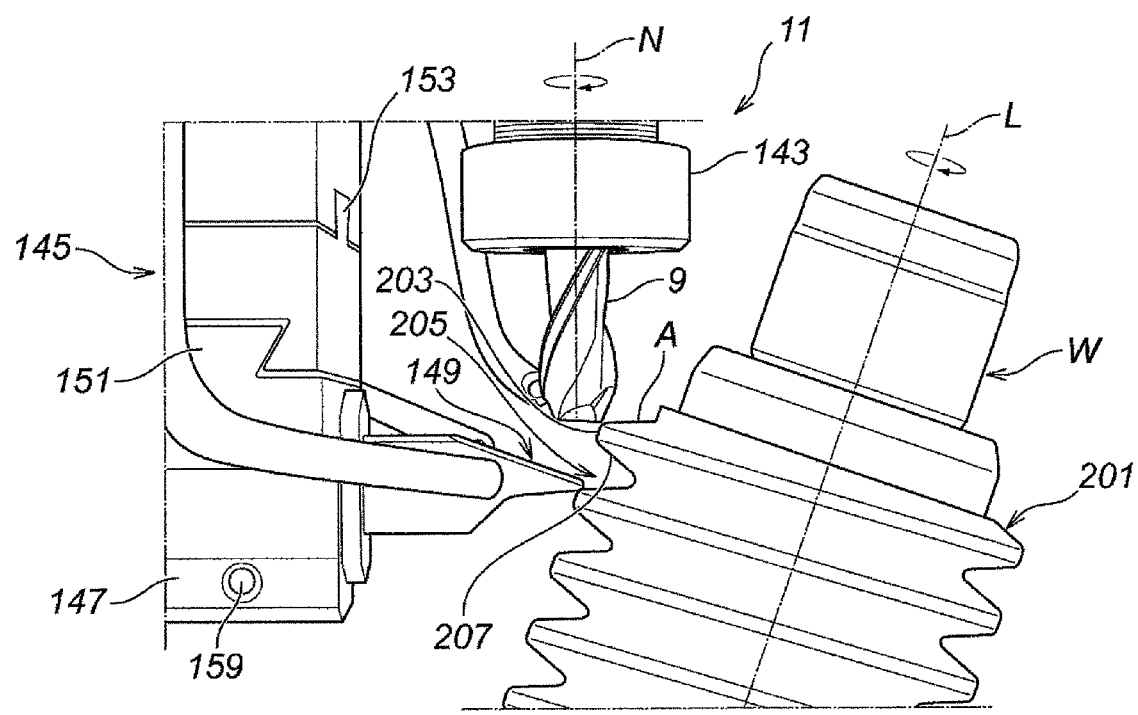
FIG. 14 is a side view of the working tool and the trace stylus according to the embodiment of the present invention, showing the finish (fifth) status of movement locus during working, as one of gradual developments of working.

As the next step, the operator rotates the front-rear position adjustment wheel 109 as well as the up-down position adjustment wheel 131, so that the tip of the stylus 149 may be facing to the valley 205 of the tooth 201 of the work W. In that state, the working tool 9 is in contact with a predetermined position of the work W. With reference to the present explanation, as illustrated in FIG. 10, the valley 205 to which the working is applied, is the second valley counted from the top end A of the tooth 201, and this valley 205 continuously follows the second peak 203 as counted from the top end A.

The positions of the working tool 9 as well as the trace stylus 149, to be suitable for the shape of the work W, may be set by adjusting the up-down position adjustment wheel 131 and the front-rear and right-left positions adjustment mechanism 145. Then the operator depresses a start button (not shown) of an operation panel 173, and starts the chamfering of the work W.

When the start button is turned ON, the work rotation shaft driving motor 37 and the working tool driving motor 133 will start rotation, and the work W starts rotation in slanted state. The working means 9 and the trace stylus 149 are both pressed toward the work W by pressing force applied by the press means 13, and first, the working tool 9 is pressed against the work W, and starts rotation in upright state, whereby the deburring and chamfering of the top end A, positioned at the top of the tooth 201 of the work W, is started. Thereafter, when the trace stylus 149 becomes in contact with the work W, the constant working volume by the working tool 9 may be maintained.

Thereafter, in accordance with the rotation of the work W, as illustrated in FIGS. 11 through 14, the trace stylus 149 moves upwardly by tracing a slant surface 207 positioned between the second valley 205 and the peak 203 (at the upper position of that valley 205), and reaches the top of that peak 203, and then further moves upwardly to another (first) valley 205 positioned at the top of the work W. The working tool 9 also moves, integrally with the movement of the trace stylus 149, and carries out the deburring and chamfering of the whole circumferential surface of the top end A. Therefore, as discussed above, the working tool 9 applies the cutting work to the whole circumferential surface of the top end A, and in such state, the trace stylus 149 becomes in contact with the work W, whereby any excessive cutting work is prohibited. This working procedure may be done on the whole circumferential surface of the work W continuously, and a predetermined volume of deburring and chamfering may be carried out.

When the chamfering of the top end A of the work W is finished, the operator depresses a stop button (not shown) of the operation panel 173, and stops the working. Then the attached position of the work W is changed, and the deburring and chamfering of the bottom end B of the tooth 201 of the work W are carried out again according to the similar process.

There will be some works W to which the desired chamfering cannot be done by simply changing the angle of the work W, and in such a case, the angle of the working tool 9 may be changed by rotating the working head angle adjustment wheel 169, whereby the desired working may be applied to more complicated shape of work W.

In an alternative embodiment, the operation wheel 61 for rotating the thread shaft 47, the working head angle adjustment wheel 169 for rotating the thread shaft 167, the front-rear position adjustment wheel 109 or up-down position adjustment wheel 131, may be replaced by (or may be additionally supported by) driving motors so that the position adjustment can be done automatically.

Further, the adjustable angles of the work rotation axis angle adjustment mechanism 21 or working tool rotation axis angle adjustment mechanism 161 may be expanded, whereby wider angle adjustment of the work W or the working tool 9 may be done. Also, it is also possible to delete the working tool rotation axis angle adjustment mechanism 161, whereby only the work rotation axis angle adjustment mechanism 21 may cope with various types of work W.

As discussed above, according to the present invention, it is possible to carry out deburring and chamfering of work having complicated shape, such as worm gear of which shape would change not only in cross-sectional direction but also in axial direction. Thus the present invention can be applied to manufacturing and utilization of working apparatus suitable for such working.

What is claimed is:

1. A working apparatus, comprising:
    a base stage;
    work hold and rotation means mounted on said base stage, serving for holding and rotating a work about a work rotation axis;
    working means, mounted on said base stage, movable toward and away from said work, and provided with a working tool;
    press means for pressing said working tool toward said work via said working means; and
    trace means, mounted on said working means, being pressed toward said work together with said working tool by said press means, said trace means being in contact with said work, and moving with said working means as a whole in forward and rearward directions towards and away from, respectively, said work, according to an outer shape of said work,
    wherein when said press means presses said working tool and said trace means toward said work when said work is in rotation, said working tool applies deburring and chamfering to said work, and said trace means becomes in contact with said work and controls deburring and chamfering of said working tool at a predetermined constant volume, so that deburring and chamfering on the whole circumferential surface of said work may be carried out at said predetermined constant volume,
    wherein said work hold and rotation means is provided with a work rotation axis angle adjustment mechanism, serving for adjusting the angle of the rotation axis of said work in a state of holding said work, and is also provided with a locking means for fixing the angle of the rotation axis of said work.

2. The working apparatus as claimed in claim 1,
    wherein said work rotation axis angle adjustment mechanism is provided with:
    a swing frame for supporting said work hold and rotation means;
    a swing shaft integrally attached to said swing frame;

a slide unit provided with a thread shaft in which a male thread is provided and the slide unit also provided with a female thread block for engaging with said thread shaft; and a link mechanism for converting motion of said slide unit in a transverse direction, transverse relative to the work rotation axis, into rotative motion of said swing shaft, wherein said swing frame swings by said transverse movement of said slide unit via said link mechanism and said swing shaft, whereby the angle of the rotation axis of said work by said work hold and rotation means may be adjusted.

3. The working apparatus as claimed in claim 2, wherein:

said link mechanism comprises a swing arm swinging integrally with said swing shaft, and a link arm for connecting said swing arm and said slide unit;

said swing arm having an arc-shaped slotted hole of which a circumferential center is positioned at a swing fulcrum of said swing arm; and wherein the lock means is capable of fixing the angle of the rotation axis of said work by fastening a lock bolt inserted in said slotted hole.

4. The working apparatus as claimed in claim 1, further comprising a working tool rotation axis angle adjustment mechanism, capable of adjusting an angle of a rotation axis of said working tool.

5. The working apparatus as claimed in claim 4, wherein said working tool rotation axis angle adjustment mechanism adjusts the angle of the rotation axis of said working tool by pivoting said working tool.

6. The working apparatus as claimed in claim 5, further comprising lock means for locking and holding the angle adjusted by said working tool rotation axis angle adjustment mechanism.

7. The working tool as claimed in any one of claims 1 through 6, wherein said work is a worm gear.

* * * * *